(12) United States Patent
Gupta et al.

(10) Patent No.: US 9,267,801 B2
(45) Date of Patent: Feb. 23, 2016

(54) METHOD AND APPARATUS FOR REDUCING INSTRUCTIONS IN AN INDOOR NAVIGATION ENVIRONMENT

(75) Inventors: Rajarshi Gupta, Santa Clara, CA (US); Min-Wook Jeong, Stanford, CA (US)

(73) Assignee: QUALCOMM Incorporated, San Diego, CA (US)

( * ) Notice: Subject to any disclaimer, the term of this patent is extended or adjusted under 35 U.S.C. 154(b) by 575 days.

(21) Appl. No.: 12/782,588

(22) Filed: May 18, 2010

(65) Prior Publication Data

US 2011/0137549 A1   Jun. 9, 2011

Related U.S. Application Data

(60) Provisional application No. 61/285,007, filed on Dec. 9, 2009.

(51) Int. Cl.
*G01C 21/34* (2006.01)
*G01C 21/20* (2006.01)
*G01C 21/36* (2006.01)

(52) U.S. Cl.
CPC ............. *G01C 21/20* (2013.01); *G01C 21/206* (2013.01); *G01C 21/34* (2013.01); *G01C 21/3453* (2013.01); *G01C 21/3476* (2013.01); *G01C 21/3629* (2013.01)

(58) Field of Classification Search
None
See application file for complete search history.

(56) References Cited

U.S. PATENT DOCUMENTS

| 6,477,463 B2* | 11/2002 | Hamilton ................ 701/431 |
| 6,490,522 B2 | 12/2002 | Sugiyama et al. |
| 6,728,636 B2* | 4/2004 | Kokojima et al. ............ 701/434 |
| 6,922,633 B2 | 7/2005 | Takenaka |
| 7,171,306 B2 | 1/2007 | Hirose |
| 7,257,485 B2 | 8/2007 | Sumizawa et al. |
| 7,546,203 B2 | 6/2009 | Miyashita |
| 8,374,780 B2* | 2/2013 | Mays et al. .................... 701/433 |

(Continued)

FOREIGN PATENT DOCUMENTS

| CN | 1924524 A | 3/2007 |
| EP | 1705459 A2 | 9/2006 |

(Continued)

OTHER PUBLICATIONS

Avneesh Sud, Russell Gayle, Erik Andersen, Stephen Guy, Ming Lin, and Dinesh Manocha. 2007. Real-time navigation of independent agents using adaptive roadmaps. In Proceedings of the 2007 ACM symposium on Virtual reality software and technology (VRST '07), Stephen N. Spencer (Ed.). ACM, New York, NY, USA, 99-106. http://doi.acm.org/10.1145/1315184.1.*

(Continued)

*Primary Examiner* — Redhwan k Mawari
*Assistant Examiner* — Edward Torchinsky
(74) *Attorney, Agent, or Firm* — Arnold J. Gum

(57) ABSTRACT

The subject matter disclosed herein relates to a system and method for determining navigation instructions in a navigation environment. A location estimate may be determined for a mobile device within an indoor pedestrian navigation environment. A user input indicating one or more destinations within the indoor pedestrian navigation environment may be received. A lowest cost path from the location estimate to the one or more destinations may be determined based at least in part on an expected number of navigation instructions associated with the lowest cost path. Such a lowest cost path may be presented to a user.

51 Claims, 7 Drawing Sheets

(56) References Cited

U.S. PATENT DOCUMENTS

| | | |
|---|---|---|
| 2004/0215389 A1* | 10/2004 | Hirose .......................... 701/209 |
| 2005/0060088 A1 | 3/2005 | Helal et al. |
| 2008/0032706 A1* | 2/2008 | Sheynblat et al. ......... 455/456.1 |
| 2009/0228201 A1 | 9/2009 | Liu |
| 2009/0234569 A1 | 9/2009 | Jansen et al. |

FOREIGN PATENT DOCUMENTS

| | | |
|---|---|---|
| JP | 2009270900 A | 11/2009 |
| KR | 100841712 | 6/2008 |

OTHER PUBLICATIONS

International Search Report and Written Opinion—PCT/US2010/059772, ISA/EPO—Sep. 7, 2011.

Kai-Florian Richter and Matt Duckham: "Simplest Instructions: Finding Easy-to-Describe Routes for Navigation", Lecture Notes in Computer Science, vol. 5266, 2008, pp. 274-289, XP000002657794, DOI: 10.1007/978-3-540-87473-718 ISBN: 978-3-540-87472-0.

* cited by examiner

METHOD AND APPARATUS FOR REDUCING INSTRUCTIONS IN AN INDOOR NAVIGATION ENVIRONMENT

CROSS-REFERENCES TO RELATED APPLICATIONS

This application claims priority to provisional patent application Ser. No. 61/285,007, entitled "Reducing Number of Instructions in Navigation," filed on Dec. 9, 2009, assigned to the assignee hereof, and expressly incorporated herein by reference.

BACKGROUND

1. Field

The subject matter disclosed herein relates to reduction of a number of navigation instructions presented to a user within an indoor navigation environment.

2. Information

Navigation systems are becoming more and more pervasive in today's market. A navigation system may be utilized to determine a route from a first location to a second location. In some navigation systems, a user may enter a start location and an end location into a mapping application, such as one of the different mapping applications commonly used on Internet websites.

Such navigation systems may be utilized by a person who is unfamiliar with a certain area and desires directions to a particular location. In the event that a destination is along a straight-line path from a user's starting location, directions may be provided to a user that are relatively easy to follow. However, in some scenarios, a user may request directions to a location that is not along a straight-line path and may require some changes in direction to arrive at a particular destination. Ease of use is a concern for navigation systems because a user is more likely to have difficulty following directions that are relatively complicated such as those involving several changes in direction along a path.

BRIEF DESCRIPTION OF THE FIGURES

Non-limiting and non-exhaustive features will be described with reference to the following figures, wherein like reference numerals refer to like parts throughout the various figures.

SUMMARY

Figure 1:
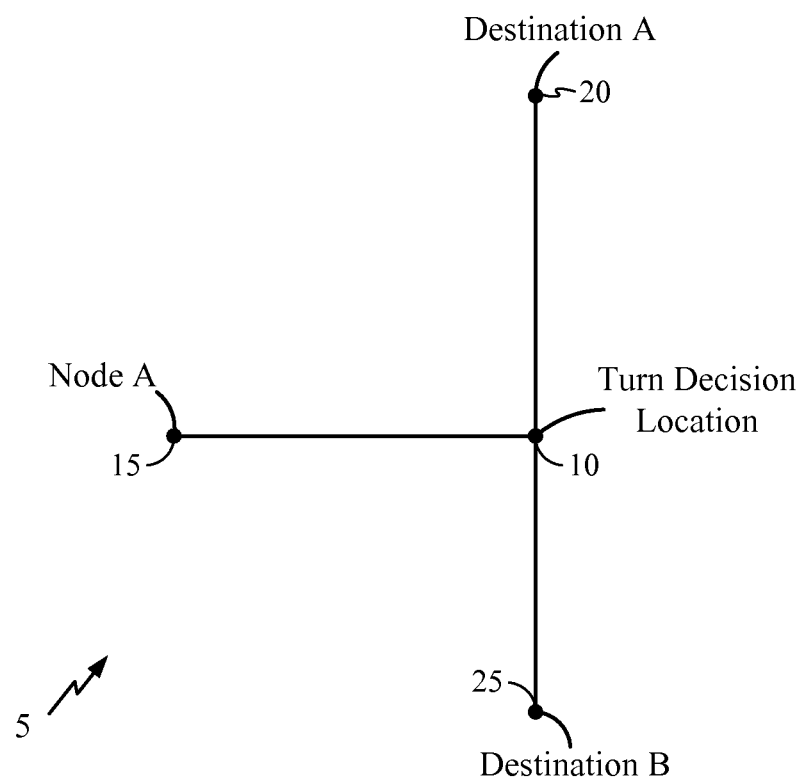
FIG. 1 illustrates a path including a turn decision location according to one or more implementations.

In one particular implementation, a system and method are provided for determining navigation instructions. For example, a location estimate may be determined for a mobile device within an indoor pedestrian navigation environment. A user input indicating one or more destinations within the indoor pedestrian navigation environment may be received. A lowest cost path from the location estimate to the one or more destinations may be determined based at least in part on an expected number of navigation instructions associated with the lowest cost path. Such a lowest cost path may be presented to a user. It should be understood, however, that this is merely an example implementation, and that claimed subject matter is not limited in this respect.

DETAILED DESCRIPTION

Reference throughout this specification to "one example", "one feature", "an example" or "a feature" means that a particular feature, structure, or characteristic described in connection with the feature and/or example is included in at least one feature and/or example of claimed subject matter. Thus, the appearances of the phrase "in one example", "an example", "in one feature" or "a feature" in various places throughout this specification are not necessarily all referring to the same feature and/or example. Furthermore, the particular features, structures, or characteristics may be combined in one or more examples and/or features.

Some implementations of navigation systems are capable of providing step-by-step instructions or directions to guide a person from a starting location to a destination. In some implementations, instructions to guide a person along a shortest path or route may be displayed on a user's mobile device, for example. Sometimes a shortest path may include multiple turns/changes in directions. In an indoor environment, for example, instructions for a path having multiple changes in directions may be difficult for a person to follow to travel between starting and destination locations.

In one or more implementations, directions/navigation instructions may be determined to guide a user along a path that is easiest for a person to follow without turning in an incorrect direction or otherwise become lost. For example, navigation instructions may be provided for a user traveling within an indoor environment, such as an office building or shopping mall. In one or more implementations, a first path capable of being followed with fewer navigation instructions than a second path may be associated with a lower overall cost than the second path. According to various implementations, as discussed below, costs may be determined for various segments and nodes of a path from a starting location to a destination. A lowest cost path may be determined and displayed or otherwise presented to a user. Various factors may be considered in calculating costs of segments and nodes, such as presence of turn decisions, visibility of a destination along a path, path length, and overall user ease in following navigation instructions, to name just a few examples.

In an indoor navigation environment, for example, it may be easier for a user to travel to a destination if the user is provided with relatively few navigation instructions. For example, a relatively long path having only a couple of turns may be easier for a user to follow than a shorter path that includes many changes in direction. For example, in an indoor environment, a path may include several different segments, each of which may be associated with only a few feet of movement. Accordingly, if a path includes 30 segments, each of which is associated with only a few feet of movement, it may be cumbersome to provide navigation instructions to guide a user along such a path.

According to one or more implementations, a person may utilize a navigation system to receive navigation instructions/directions to guide such a person from a starting location to a destination within an indoor pedestrian navigation environment. A "navigation instruction," as used herein, may refer to an instruction to direct a user from one node to another along a path. For example, a navigation instruction may comprise one or more directions between a first node and a second node. For example, there may be several nodes along a path from a starting location to a destination and multiple navigation instructions may be presented to guide a user to such a destination. Examples of navigation instructions may include instructions such as, "turn left," "turn right," and "head straight to room 55," to name just a few among many different navigation instructions.

A "node," as used herein, may refer to a location where an obstacle is located along a path or a potential change in the path is otherwise encountered. For example, a node may refer to a location at which a user's direction may be altered in one or more directions. In one example, if a user is guided to an intersection of a hallway and may either continue travelling in a forward direction or may turn at a 90 degree right angle, such an intersection may comprise a node. Alternatively, if a user encounters an obstruction such as a cubicle wall along a path that may require such a user to walk around or otherwise travel around the obstruction, such an obstruction may comprise a node. The cost of a path (e.g., the lowest cost path) may be discounted based, at least in part, on a distance between at least two nodes in the path.

In one or more implementations, a cost may be determined for individual segments between nodes along a path or such nodes themselves and navigation instructions for a path having a lowest cost may be presented to a user. For example, a version of Dijkstra's algorithm may be utilized to determine a total cost for a particular path. A "cost," as used herein, may refer to a value assigned to one or more segments or nodes along a path that are indicative of certain predefined criteria, such as simplicity of navigation, for example. In one or more implementations, a lowest cost path may comprise a path that is the relatively easiest for a user, such as a pedestrian, to travel without making a wrong turn or otherwise getting lost along the path. For example, a path capable of being followed by presenting the fewest number of expected navigation instructions may comprise a lowest cost path.

A cost may be assigned to one or more turn decision locations along a path. A "turn decision location," as used herein may refer to a node comprising a location at which point a change in direction along a given path occurs and a person has an option of travelling in at least two different directions. For example, in one implementation, a turn decision location may be located at a node where a person travelling in a straightforward direction has an option of either turning to his/her right or his/her left. For example if a person is travelling through a hallway and reaches an end of the hallway, and can either make a 90 degree turn and travel to his/her right or make a 90 degree turn in the opposite direction and travel to his/her left, such a change in direction occurring at such an intersection may comprise a turn decision location.

FIG. 1 illustrates a path 5 including a turn decision location 10 according to one or more implementations. In this example, a user may be travelling from Node A 15 in a direction toward turn decision location 10. At turn decision location 10, a user has an option of making a 90 degree turn and proceeding in a direction toward Destination A 20 or making a 90 degree turn in the opposing direction and heading toward Destination B 25. Accordingly, turn decision location 10 may comprise a node at which a person travelling in a straightforward direction has an option of either turning to his/her right (e.g., toward Destination B) or his/her left (e.g., toward Destination A). In one or more implementations, a change in direction less than a threshold amount may comprise a turn decision location, as discussed below with respect to FIGS. 2 and 3.

In one or more implementations, a cost may be assigned to one or more segments of a path. A "segment," as used herein, may refer to a space between two adjacent nodes along a path. In one implementation, a single long segment may be assigned a lower cost than a combination of relatively short segments that have an overall length shorter than that of the long segment. In some implementations, a turn decision location may be assigned a higher cost than some relatively long segments. A high cost may indicate increased travel time, greater difficulty to follow a path, a greater chance of becoming lost, among other things, and may therefore be undesirable. Accordingly, in some implementations, a path having several segments and several turn decision locations may be assigned a higher cost than a different path having longer segments but fewer turn decision locations.

Multiple end-to-end adjacent segments may comprise a "super edge." A "super edge," as used herein may comprise two or more segments along a path extending until a turn decision location is reached. For example, if a path extends through several intersections without turning, such a portion of a path may comprise a super edge. A super edge may be assigned a cost in determining an overall cost for a path. A super edge may be assigned a relatively lower cost than other corresponding segments comprising a similar distance because a super edge in a route may be easier for a person/user to follow. In other words, it may be simpler for a person to follow navigation instructions where such navigation instructions direct a user to continue to travel in a straight line, as opposed to navigation instructions directing a user to make one or more turn decisions along a path.

In one or more implementations, a person may utilize a mobile device capable of transmitting and receiving wireless signals. For example, such a mobile device may comprise a Personal Digital Assistant (PDA), cell phone, or laptop computer. Such a mobile device may have a graphical user interface capable of presenting a mapping application to a user. Such a mobile device may also be capable of presenting audio navigation instructions to a user such as via a speaker, for example. In one or more implementations, a user may enter or otherwise provide a destination into a mapping application via a user input device. In one example, a user may select a destination on a displayed map or may otherwise indicate a destination such as by typing a name of a destination. For example, if a user is within a mall, such a user may enter a name of a particular store, such as "Macy's" or may instead enter a more general term, such as "department store" or "shoe store."

In order to determine navigation instructions to guide a user to a destination, a user's starting location may also be utilized. In one example, a user may type or otherwise enter a starting location into a mapping application. In one implementation, a mobile device may estimate its location based on navigation signals received from a Satellite Positioning System (SPS), such as GPS or Galileo by, for example, correlating pseudorange measurements from multiple (e.g., four or more) transmitters.

However, a mobile device may be utilized within an area where navigation signals from a Satellite Positioning System (SPS) are not available, such as, for example, within certain buildings. In one implementation, a mobile device may estimate its location based on signals wirelessly received from wireless network elements or other devices capable of wirelessly transmitting signals. Wireless network elements, such as wireless local area network (WLAN) access points or femtocells, for example, may be located throughout such an area at known locations and a mobile device may estimate ranges from the mobile device to particular wireless network elements (e.g., by measuring received signal strength or round-trip delay). Such ranges can be estimated, and a location of such a mobile device may be triangulated using known techniques.

In one or more implementations, a mobile device may determine its location based at least in part on wireless communications with at least one other wireless device associated with a known location, such as an access point, a femtocell, or another mobile device, for example. In one or more implementations, a mobile device may receive a location information, such as a location estimate, from another wireless device via a Wi-Fi, radio, Bluetooth, or Ultra-wideband (UWB) communication, to name just a few among many different types of wireless communications. In some implementations, a mobile device may estimate its range from an access point, a femtocell, or another mobile device based at least in part on a Receive Signal Strength Indication (RSSI) of a communication from the access point or other mobile device, for example. In some implementations, a mobile device may estimate its range from an access point, a femtocell, or another mobile device based at least in part on a Round Trip Time (RTT) delay, for example, to estimate its range from a wireless device based at least in part on a measured length of time for a wireless signal to travel from the wireless device to the mobile device.

In one or more implementations, a mapping application executed by a user's mobile device may determine navigation instructions to reach a destination and may present navigation instructions for a lowest cost path to a user. For example, if a map corresponding to an area where a user is located is stored on a mobile device, a user may provide a destination via a user input device. A user may also provide a starting location via a user input or such a location may be otherwise be determined by a mobile device. A mapping application may thereafter determine a lowest cost path to direct a user from a starting location to a destination and may present corresponding navigation instructions to a user. For example, navigation instructions may be presented on a display screen of a user's mobile device. A speaker or earphones, for example, may also be utilized to present audible navigation instructions to a user.

In some implementations, a network element, instead of a user's mobile device, may determine a lowest cost path to guide a user from a starting location to a destination. For example, a user's mobile device may provide starting location and destination information to a network element which may determine a lowest cost path and may present corresponding navigation instructions to guide a user along such a lowest cost path. A navigation system may determine one or more paths to guide a user from a starting location to a destination and at least some paths may include multiple segments which may guide a user past multiple nodes or turn decision locations. In one or more implementations, a certain number of navigation instructions may be displayed or otherwise presented to a user, e.g., on a user's mobile device. In one or more implementations, a lowest cost path may comprise a path upon which a user may be guided to a destination with a fewest number of navigation instructions. A cost may be determined for each segment of a path and may be based upon various factors such as ease of following the path without making a wrong turn or otherwise getting lost. In one or more implementations, cost for a particular segment may depend at least partially upon how crowded a certain segment may be because, for example, a user may have more difficulty following certain navigation instructions while travelling along a segment in a building, for example, that is relatively crowded. A cost for a segment may also be dependent upon whether a segment comprises a narrow hallway, passes by one or more bathrooms, or contains relatively poor lighting, to name just a few among many possible factors that may impact a cost afforded to a particular segment. A cost may also be determined for turn decision locations or other nodes. For example, if a user has many different possible directions to turn at a turn decision location, a higher cost may be applied to such a turn decision location than may be determined if there are only two possible directions in which a user may travel, such as in the example shown in FIG. 1.

Another factor that may impact a cost for a segment or node is an elevation change in path. For example, a segment in which a user is directed to travel up an escalator, elevator, or stairs may be associated with a higher cost than a segment that pertains to a single floor of a building because, for example, there may be a greater risk that a user may become lost.

As discussed above, one or more implementations as discussed herein may be utilized within an indoor navigation environment. An "indoor navigation environment," as used herein, may refer to an indoor environment in which a pedestrian may be guided from a starting location to a destination. Examples of indoor navigation environments include, for example, residential or commercial buildings, such as office buildings, stadiums, convention centers, shopping malls, hospitals, airports, and schools, to name just a few examples. In some indoor navigation environments, a user may receive navigation instructions to direct the user to walk or otherwise travel such as via a wheelchair from a starting location to a destination through the use of an escalator, moving walkway, or an elevator. As discussed above, one or more implementations may guide a user along a path that is easiest to follow in an indoor environment. For example, factors such as lighting, crowdedness, visibility of a destination along a path, may be factored in while determining a lowest cost path.

Figure 2:
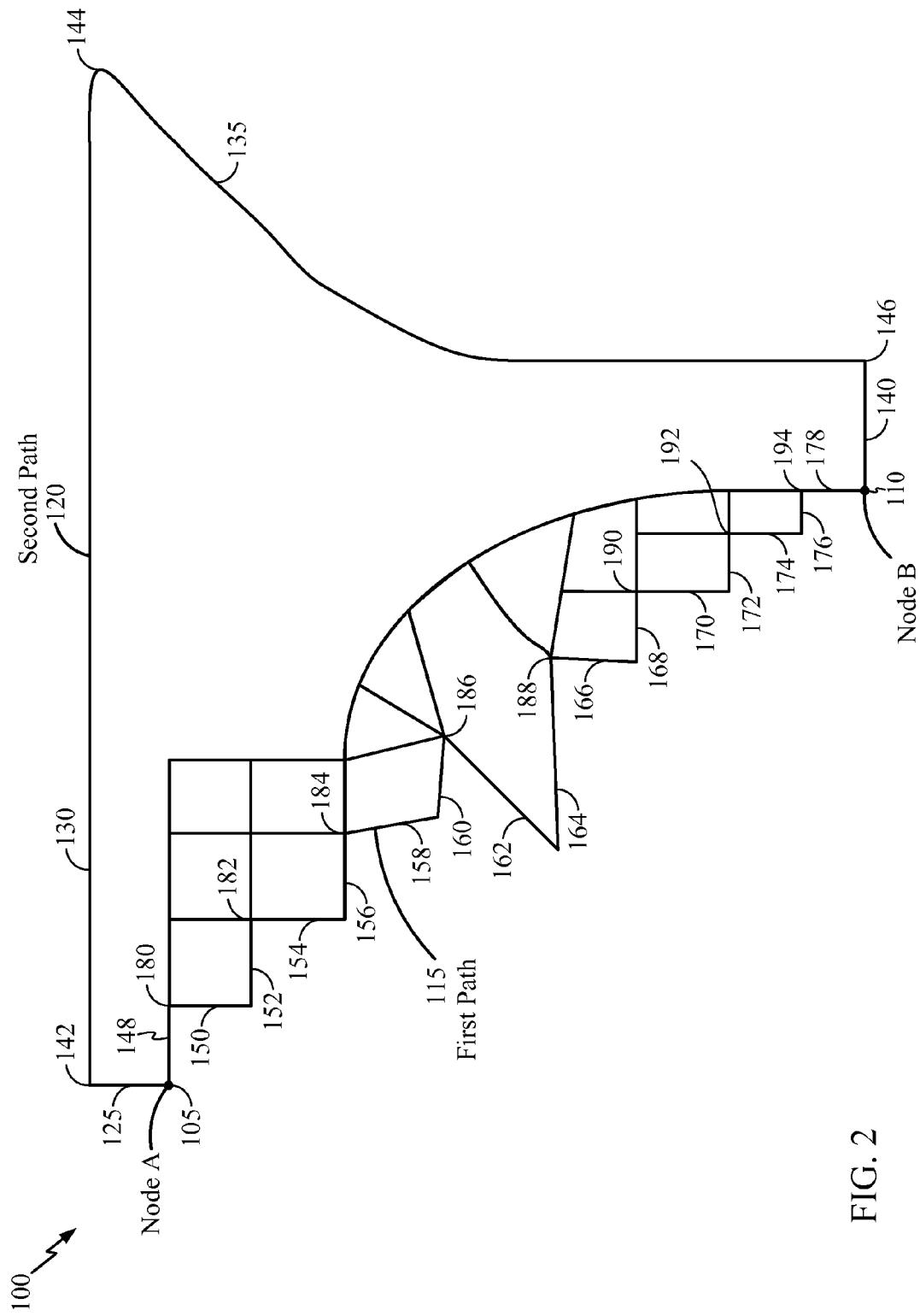
FIG. 2 is a map showing two different paths for directing a user from a Node A to a Node B according to one or more implementations.

FIG. 2 is a map 100 showing two different paths for directing a user from Node A 105 to Node B 110 according to one or more implementations. In one particular implementation, a user may travel within an indoor navigation environment with a mobile device. Such a mobile device may include a graphical user interface for presenting a map to a user. A map may be pre-stored on a user's mobile device prior to traveling to an indoor environment associated with the map, or the map may be retrieved or received from a location or map server, for example. A user may utilize a user input to provide a destination or a starting location to a mapping application hosted or executed by one or more processing units of a mobile device, for example. In an example shown in FIG. 2, a user's starting location is at Node A 105 and a destination is at Node B 110. In one implementation, a user may provide an exact name of a destination via a user input, such as a name of a store in a mall, such as "Macy's," or a department of a particular store, such as "shoe department of Macy's," for example. A user may also provide coordinates of a destination location, such as earth-centered coordinates or local coordinates known to a mapping application. Alternatively, if a mobile device includes a touch screen, a user may touch an area of a displayed map that is an intended destination. In another example, a user may enter a general term, such as "women's shoes" via a user input and a mapping application may determine one or more locations within an area depicted on a map that may sell women's shoes.

After both a starting location, e.g., Node A 105, and a destination, e.g., Node B 110, have been determined, the best or lowest cost path between Node A 105 and Node B 110 may be determined and costs associated with the path may be calculated based on characteristics of the path. After such costs have been calculated, navigation instructions for a lowest cost path may be presented to a user.

In the example shown in FIG. 2, at least two different paths are possible—e.g., a first path 115 and a second path 120. Various costs may be determined based on each path. As shown, first path 115 has an overall shorter length than second path 120. A segment extending between two adjacent nodes, for example, may be discounted relative to a longer segment. A longer path may be assigned a higher cost than a relatively shorter path, all else being equal, for example. However, in this example, there are other aspects of first path 115 which may be assigned higher costs than aspects of second path. For example, second path 120 is comprised of four segments 125, 130, 135, and 140. Second path 120 includes a total of three change of direction locations 142, 144, and 146. However, second path does not include any turn decisions. For example, upon starting with segment 125 after Node A, a user may travel across segments 130, 135, and 140 until Node B 110 is reached and would not have to make any decisions regarding directional changes. For example, although a user's direction may change at change of direction 142, a user does not have an option of traveling in any direction other than to segment 130 unless such a user makes a complete U-turn and returns back to Node A 105. Therefore, because a user does not have an option of travelling in any direction other than along segment 130 after an end of segment 125 has been reached, change of direction location 142 does not comprise a "turn decision location." In one or more implementations, a change of direction location may be assigned a cost, but such a cost may be lower than a cost that would be assigned if a turn decision location were encountered instead. If map 100 depicts a map of a floor plan for an office building, stadium, or other structure, for example, a combination of segments 125, 130, 135, and 140 may comprise a long corridor or hallway having several change of direction locations, although there is only one direction at which a user can turn at any of such change of direction locations.

First path 115, on the other hand, may include several turn decision locations. As shown, first path 115 may include segments 148, 150, 152, 154, 156, 158, 160, 162, 164, 166, 168, 170, 172, 174, 176, and 178. First path may also include several turn decision locations such as 180, 182, 184, 186, 188, 190, 192, and 194. At turn decision locations, a user may have an option of turning in two or more different directions. A user is more likely to get lost and veer from a designated path if one or more turn decision locations are encountered. In this case, there are many turn decision locations along first path 115 and each may be assigned a cost.

Another factor which may be considered in determining a cost for a particular path is whether a destination is within a line-of-sight at each node, obstacle, change of direction location, or turn decision location. The cost of a path (e.g., the lowest cost path) may be discounted in response to one or more destinations being visible at multiple nodes of the path. If a destination is within a line-of-sight at all points along a path, for example, an overall cost of the path may be discounted in some implementations. In this example, Node B is not visible via line-of-sight at practically each node, obstacle, change of direction location, or turn decision location along either of first path 115 or second path 120. For example, if map 100 depicts a structure such as a building having walls, Node B 110 would not be visible at turn decision location 184, for example, because, for example, segment 162 obstructs a line-of-sight with Node B. Similarly, at change of direction location 144 of second path 120, Node B 110 is not visible because of an obstruction presented by segment 140, for example. In this example, first path 115 may have a higher cost than second path 120 even though it is shorter than second path 120 because it includes many more turn decision locations.

Figure 3:
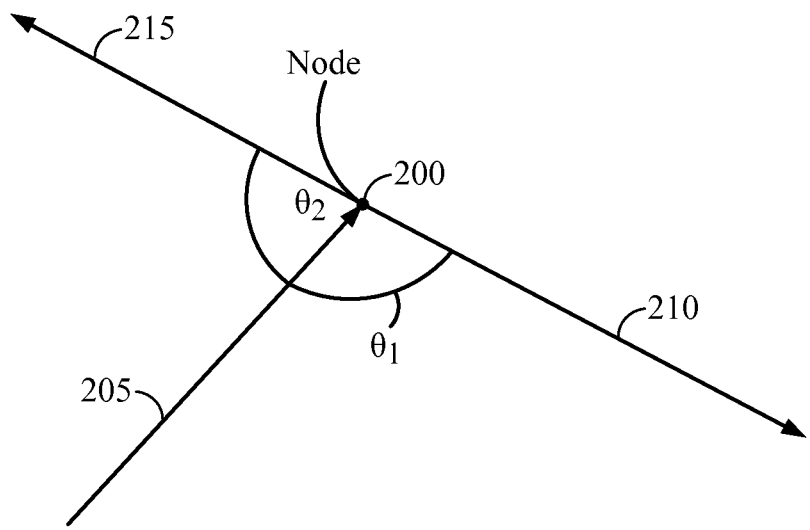
FIG. 3 illustrates a Node at which a turn decision location is present according to one or more implementations.

FIG. 3 illustrates a Node 200 at which a turn decision location is present according to one or more implementations. If, for example, a user is directed toward Node 200 along segment 205, such a user may have an option of turning in one of two directions, to travel along segment 210 or segment 215. In one or more implementations, a maximum and/or minimum threshold angle between segments may be sufficient to qualify as a change in direction for a turn decision location. As discussed above, such a categorization of a node as a turn decision location may be associated with a particular cost. In one example, an angle of no more than 120 degrees or no less than 60 degrees may be sufficient to constitute a turn decision location. It should be appreciated, however, that 60 and 120 degrees are merely examples of minimum and maximum angles and that in some implementations, a larger or smaller threshold angle may instead be utilized. It should also be appreciated that at a node there are two angles indicating a relationship between a segment incoming to the node and a segment outgoing from the node. The sum of both angles is 360 degrees. For example, if one measurement of an angle between two segments is 90 degrees, then a measurement of a second angle between such segments would therefore be 270 degrees. For the purposes of the discussion herein, only an angle having a value of no more than 180 degrees may be considered in making a determination of a turn decision location.

Referring again to FIG. 3, a segment 205 points in toward Node 200. At Node 200, a user may be directed either along segment 215 or segment 210. An angle between segment 205 and segment 210 as measured at Node 200 is denoted as $\theta_1$. Similarly, an angle between segment 205 and segment 215 as measured at Node 200 is denoted as $\theta_2$. In this example, both $\theta_1$ and $\theta_2$ may have values between 60 and 120 degrees and may therefore qualify as turn decision locations. In some implementations, for example, a measurement of an angle between an incoming segment and an outgoing segment at a node may be assigned a cost based at least in part on the measurement. For example, a smaller measurement may be assigned a larger cost than a larger measurement because a smaller measurement is associated with a corresponding larger change in direction for a user. In some other implementations, on the other hand, each angle qualifying as a turn decision location may be assigned a fixed cost.

Figure 4:
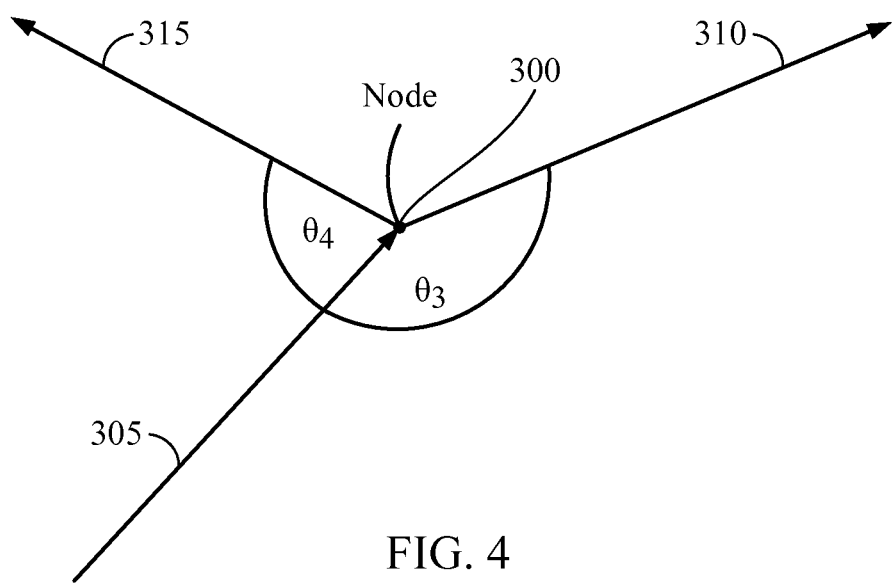
FIG. 4 illustrates a Node at which a turn decision location is present according to one or more implementations.

FIG. 4 illustrates a Node 300 at which a turn decision location is present according to one or more implementations. If, for example, a user is directed toward Node 300 along segment 305, such a user may have an option of turning in one of two directions, to travel along segment 310 or segment 315. In FIG. 4, an angle between segment 305 and segment 310 as measured at Node 300 is denoted as $\theta_3$. Similarly, an angle between segment 305 and segment 315 as measured at Node 300 is denoted as $\theta_4$. In this example, $\theta_3$ has a value greater than a predefined threshold value, such as 120 degrees, whereas $\theta_4$ has a value less than such a predefined threshold value. Accordingly, if a user is instructed to travel from segment 305 to segment 310, Node 300 would not constitute a turn decision location. On the other hand, if a user is instructed to travel from segment 305 to segment 315, Node 300 would constitute a turn decision location.

Figure 5:
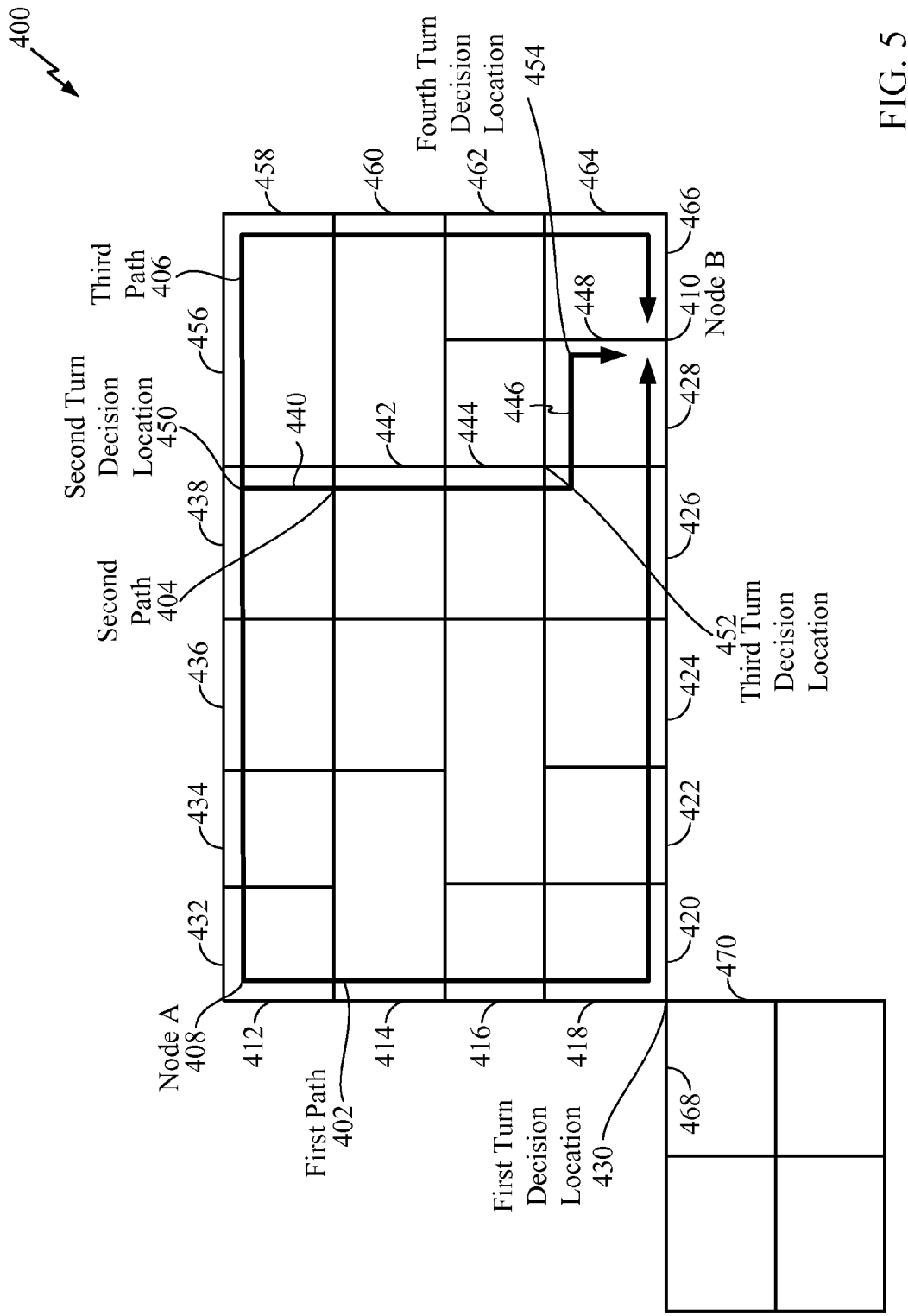
FIG. 5 is a map showing first, second, and third paths to direct a user from Node A to Node B according to one or more implementations.

FIG. 5 illustrates a map 400 showing a first path 402, a second path 404, and a third path 406 to direct a user from Node A 408 to Node B 410 according to one or more implementations. As shown, first path 402 comprises segments 412, 414, 416, 418, 420, 422, 424, 426, 428 and first turn decision location 430. Second path 404 comprises segments 432, 434, 436, 438, 440, 442, 444, 446, 448 and second, third, and fourth turn decision locations 450, 452, and 454. Third path 406 partially overlaps with a portion of second path 404. As illustrated, third path 406 comprises segments 432, 434, 436, 438, 456, 458, 460, 462, 464, and 466.

A cost may be determined for each segment along a path, turn decision location, or obstacle present, for example. Each of first path 402, second path 404, and third path 406 includes several portions where a path extends from one segment to an adjacent segment and there is a node in between but there is no turn decision location present at such a node. For example, a node is present between segments 412 and 414 of first path 402, but such a path extends in a substantially straight line from segment 412 to segment 414. Accordingly, there is little chance of a user becoming confused if receiving navigation instructions to travel from segment 412 to segment 414. Such a concatenation of adjacent segments without a turn decision location disposed in between such segments may be referred to herein as a "super edge" or "super segment." A super edge may allow for continued ease for a user to navigate between any possibly turn decision locations because they may include a relatively long portion of a path without any such turn decision locations. In computing a cost of segments in a path, a discount may be applied to a portion of a path comprising a super edge.

As illustrated, first path 402 includes two super edges—a first super edge comprises segments 412, 414, 416, and 418, and a second super edge comprises segments 420, 422, 424, 426, and 428. A turn decision location is disposed between such super edges. If a user is travelling along segment 418 and reaches first turn decision location 430, the user may have an option to travel in three different directions—either across segment 420, 468, or 470. In this example, first path 402 includes segment 420. However, there is a chance that a user reaching first turn decision location 430 may become confused and accidentally turn in the wrong direction and travel along segments 468 or 470. Accordingly, a cost is assigned to first turn decision location 430. In this example, there are three different directions in which a user can travel upon reaching first turn decision location 430. In other examples, there may be two or four or more possible directions in which a user may turn at a turn decision location. In general, the more possible directions in which a user may turn at a turn decision location, the greater the possibility that a user will travel along an incorrect segment or veer off an intended path. Accordingly, in one or more implementations, a higher cost may be assigned to a turn decision location based at least in part on a possible number of different segments/directions in which a user may proceed upon reaching such a turn decision location.

Second path 404 includes two super edges. A first super edge is comprised of segments 432, 434, 436, and 438. A second super edge is comprised of segments 440, 442, and 444. At second turn decision location 450, a user has an option of proceeding along segment 456 or segment 440. After traveling across segment 448, a user may reach Node B 410.

Third path 406 may comprise two super edges. A first super edge may include segments 432, 434, 436, 438, and 456. A second super edge may comprise segments 458, 460, 462, and 464. After travelling across segment 464, segment 466 may be traversed to reach Node B. As shown, third path 406 includes two changes of directions but no turn decision locations. For example, a user may change direction after traversing segment 456 and continuing onto segment 458. However, because a user has only one direction in which to proceed after reaching an end of segment 456, a user would therefore not need to make a decision as to which direction to travel as there is only one direction. Accordingly, such a change in direction is akin to travelling down a corridor in an office building, for example, where a hallway veers in different direction but a user has only one direction in which to turn to proceed along a path down such a hallway. Accordingly, such changes in direction present in third path 406 may be associated with lower costs than would turn decision locations.

As shown in FIG. 5, first path 402 and second path 404 comprise approximately equal distances. However, first path 402 includes only one turn decision location, whereas second path 404 includes three different turn decision locations. Accordingly, second path 404 may be associated with a higher cost than first path 402 as a result of such additional turn decision locations, among other factors.

Third path 406 may comprise a longer distance than first path 402 or second path 404. However, because third path 406 does not include any turn decision locations, third path 406 may be associated with an overall lower cost than either first path 402 or second path 404.

In the event that, for example, a user indicated via a mobile device that he or she wanted navigation instructions from Node A 408 to Node B 410, navigation instructions directing such a user along third path 406 may be presented to such a user. For example, if a user's mobile device contains a graphical user interface, a map 400 may be displayed along with arrows or other indicia indicating a direction of travel for user to reach Node B 410. In one or more implementations, a user's mobile device may periodically update its locations or receive updates indicative of a current location. Accordingly, if such location updates are available, a user's movement along third path 406 may be displayed on map 400.

In one or more implementations, step-by-step navigation instructions may be presented to a user. For example, a particular navigation instruction may read "walk 25 feet and then turn at a right angle," for example. In one or more implementations, step-by-step audio navigation instructions may be presented to a user. For example, a spoken phrase "walk 25 feet and then turn at a right angle," may be transmitted to or generated by a user's mobile device and presented via a speaker to a user.

As discussed above, there are several different elements which may be associated with costs. For example, a turn decision location may be associated with a relatively high cost, whereas a change in direction location not associated with a turn decision may be associated with a relatively low cost. An overall length of a path may be associated with a certain cost, where a longer path is associated with a higher cost than a corresponding shorter path. However, as discussed above, an increased cost due to a longer path length may be offset if, for example, there are relatively few, or no, turn decision locations in such a path. A presence of several end-to-end segments forming a super edge may be associated with a lower cost than if a cost for each segment were summed individually in some implementations. In some implementations, display or audio capabilities of a user's mobile device may have an influence on weights of certain costs. For example, if a mobile device does not have graphical display capabilities or only has a small display that is not capable of displaying an entire map, some turn decision locations may be assigned a relatively lower cost if it would otherwise be prohibitive to provide navigation instructions for a longer path with fewer turns in an easily perceivable manner.

In general, a lowest cost path may be determined to be a path that is easiest for a user to follow without making a wrong turn or otherwise veering off path.

Figure 6:
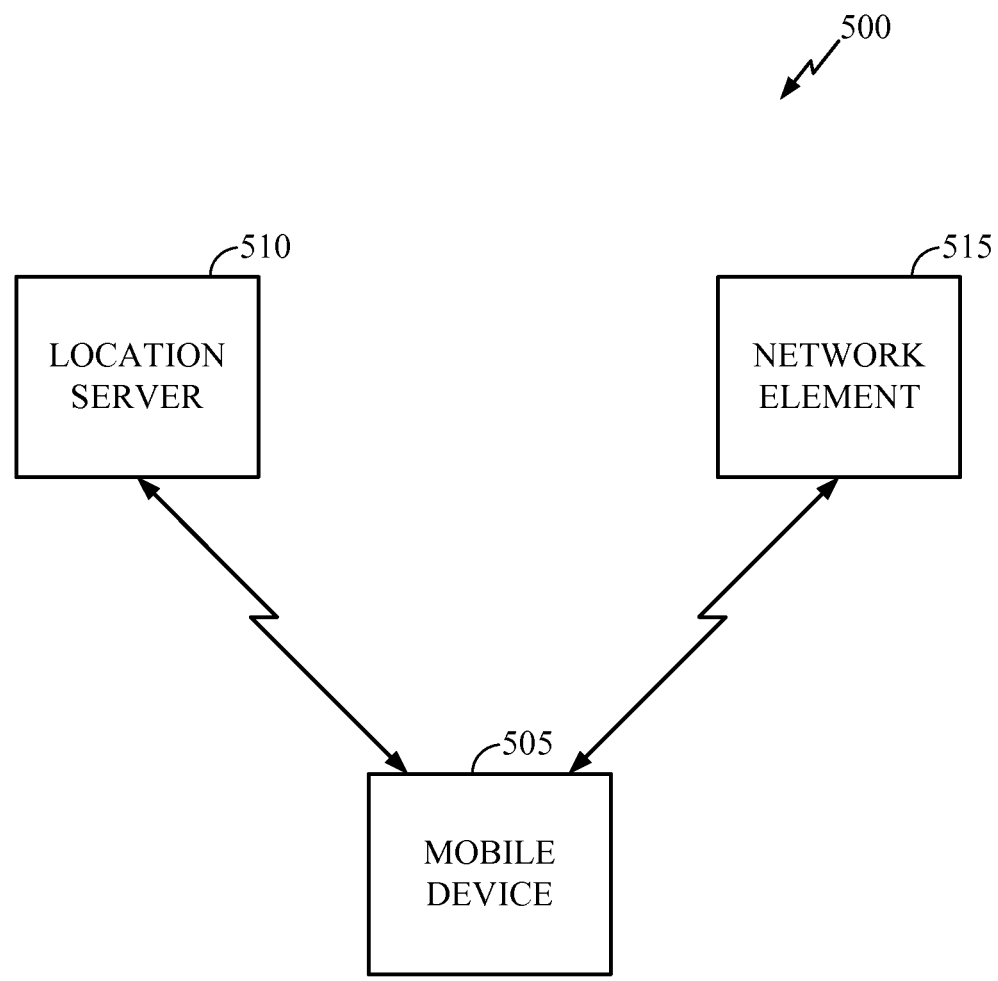
FIG. 6 is a schematic diagram of a system to transmit mapping information to a mobile device according to one or more implementations.

FIG. 6 illustrates a system 500 for transmitting mapping information to a mobile device 505 according to one or more implementations. As shown, system 500 may include a location server 510 and a network element 515.

If one or more maps have been retrieved and stored in a memory of mobile device 505, one or more of such maps may be presented to a user. For example, a map may be displayed on a graphical user interface of mobile device 505. A user may utilize a user input device of mobile device 505 to indicate a destination. A user may also input a starting point or mobile device 505 may estimate its current location, for example, as discussed above.

If a starting location and a destination are provided or otherwise determined, navigation instructions to direct a user from such a starting location to such a destination may be determined. In one or more implementations, such navigation instructions may be determined locally by a mapping application of mobile device 505, for example. In some implementations, mobile device 505 may transmit a starting location and destination to location server 510 which may determine navigation instructions for a lowest cost path. Upon determining such navigation instructions, location server 510 may transmit such navigation instructions to mobile device 505 where they may be presented to a user.

One or more implementations, as discussed above, provide various advantages within the context of an indoor navigation environment. For example, a simplest or lowest cost path may be displayed or otherwise presented to a user to guide the user from a starting location to a destination. Costs may be determined for one or more segments and nodes or turn decision locations between a starting location and a destination. Various costs may be determined for such segments and nodes or turn decision locations based upon factors such as, for example, lighting along a segment, crowdedness, width of an area along which a user is guided, visibility of a destination while travelling along a route, or other factors which may have a bearing upon whether a user is likely to veer off an intended route or otherwise become lost. Such costs may therefore be determined and summed for segments or nodes to determine a lowest cost path for which to provide navigation instructions to a user. Determining costs in such a manner may provide numerous advantages and may result in a path that is easiest for a user to follow being displayed or otherwise presented to a user.

Such advantages as discussed above may not be achievable or relevant in an outdoor navigation environment. For example, in a vehicle navigation environment, ease of following a navigation route may not have a direct impact upon a specific route determined and displayed to a user. In one outdoor navigation environment, a driver of a vehicle may be directed to travel along a road that includes numerous turn decision locations, even if an alternative path has fewer turn decision locations. For example, such an alternate path may be associated with a higher cost if the alternate path is much longer such that disadvantages due to its increased length outweigh its advantages of being followed with fewer navigation instructions.

Figure 7:
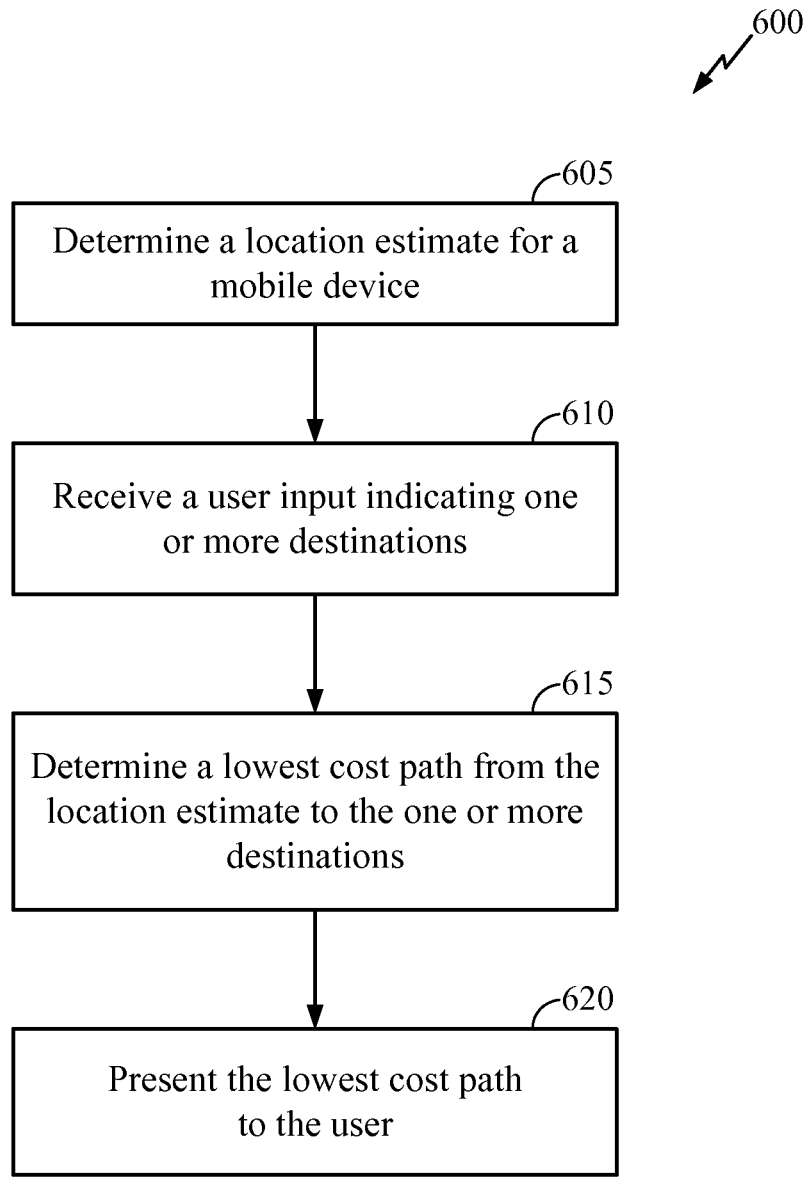
FIG. 7 is a flow diagram of a process for determining navigation instructions to a destination according to one or more implementations.

FIG. 7 illustrates a method 600 for determining navigation instructions to a destination according to one or more implementations. First, at operation 605, a location estimate for a mobile device may be determined. For example, such a mobile device may be capable of estimating its own location or a user may provide such an estimate via a user input device. Next, at operation 610, a user input indicating one or more destinations within an indoor pedestrian navigation environment may be received. A user may provide a specific location or a name of a particular item, such as coffee, which may available at one or more locations within an indoor pedestrian navigation environment. At operation 615 a lowest cost path from a location estimate for a mobile device to one or more destinations (e.g., provided by a user) may be determined, for example, based at least in part on an expected number of navigation instructions associated with the lowest cost path. For example, a lowest cost path may comprise a path capable of being followed with the fewest number of navigation instructions. Finally, at operation 620, the lowest cost path may be presented to a user.

Figure 8:
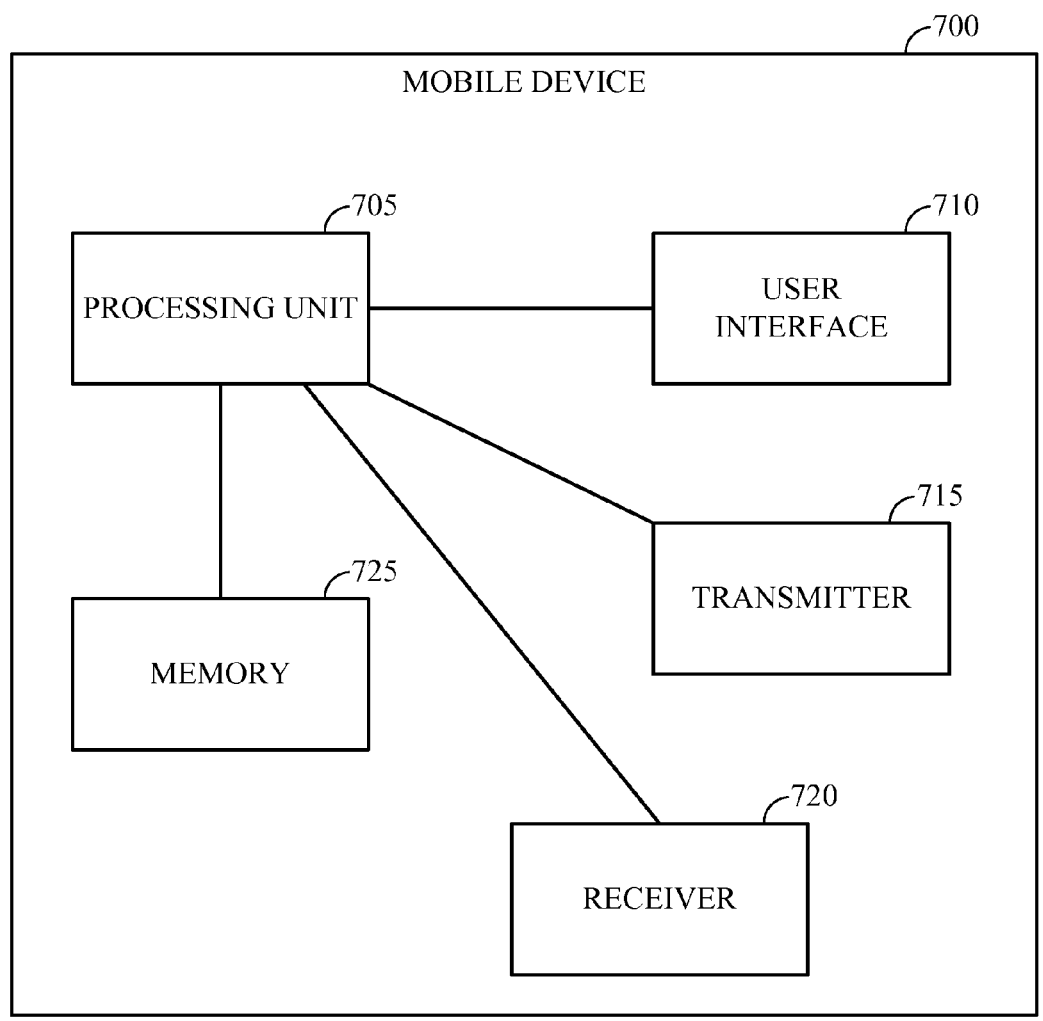
FIG. 8 is a schematic block diagram of a mobile device according to one or more implementations.

FIG. 8 is a schematic block diagram of a particular implementation of a mobile device 700 according to one or more implementations. Mobile device 700 may comprise a mobile station (MS) in which a radio transmitter may be adapted to modulate an RF carrier signal with baseband information, such as voice or data, and a radio receiver may demodulate a modulated RF carrier to obtain such baseband information.

Mobile device 700 may include several elements such as a processing unit 705, user interface 710, transmitter 715, receiver 720, and memory 725. User interface 710 may comprise a plurality of devices for inputting or outputting user information such as voice or data. Such devices may include, for example, a keyboard/keypad, a display screen (e.g., a touch screen), a microphone, a speaker, buttons and knobs, just to name a few examples. User interface 710 may present a map to a user.

Memory 725 may be adapted to store machine-readable instructions, which are executable to perform one or more of processes, examples, implementations, or examples thereof which are described or suggested. Processing unit 705 may be adapted to access and execute such machine-readable instructions. Through execution of these machine-readable instructions, processing unit 705 may direct various elements of mobile device 700 to perform one or more functions.

Transmitter 715 may utilize an antenna to transmit communications, such as packet-based communications to other wireless devices. Receiver 720 may also utilize such an antenna to receive communications, such as packet-based communications from other wireless devices.

A satellite positioning system (SPS) typically includes a system of transmitters positioned to enable entities to determine their location on or above the Earth based, at least in part, on signals received from the transmitters. Such a transmitter typically transmits a signal marked with a repeating pseudo-random noise (PN) code of a set number of chips and may be located on ground based control stations, user equipment and/or space vehicles. In a particular example, such transmitters may be located on Earth orbiting satellite vehicles (SVs). For example, a SV in a constellation of Global Navigation Satellite System (GNSS) such as Global Positioning System (GPS), Galileo, Glonass or Compass may transmit a signal marked with a PN code that is distinguishable from PN codes transmitted by other SVs in the constellation (e.g., using different PN codes for each satellite as in GPS or using the same code on different frequencies as in Glonass). In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, Beidou over China, etc., and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

As used herein, a mobile station (MS) refers to a device such as a cellular or other wireless communication device, personal communication system (PCS) device, personal navigation device (PND), Personal Information Manager (PIM), Personal Digital Assistant (PDA), laptop or other suitable mobile device which is capable of receiving wireless communication and/or navigation signals. The term "mobile station" is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile station" is intended to include all devices, including wireless communication devices, computers, laptops, etc. which are capable of communication with a server, such as via the Internet, Wi-Fi, or other network, and regardless of whether satellite signal reception, assistance data reception, and/or position-related processing occurs at the device, at a server, or at another device associated with the network. Any operable combination of the above are also considered a "mobile station."

Devices, such as transmitters and/or receivers may provide functionality, for example, through the use of various wireless communication networks such as a wireless wide area network (WWAN), a wireless local area network (WLAN), a wireless personal area network (WPAN), and so on. The terms "network" and "system" are often used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a Long Term Evolution (LTE) network, a WiMAX (IEEE 802.16) network, and so on. A CDMA network may implement one or more radio access technologies (RATs) such as CDMA2000, Wideband-CDMA (W-CDMA), and so on. CDMA2000 includes IS-95, IS-2000, and IS-856 standards. A TDMA network may implement Global System for Communications (GSM), Digital Advanced Phone System (D-AMPS), or some other RAT. GSM and W-CDMA are described in documents from a consortium named "3rd Generation Partnership Project" (3GPP). CDMA2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be used for any combination of WWAN, WLAN and/or WPAN. The techniques may be implemented for use with an Ultra Mobile Broadband (UMB) network, a High Rate Packet Data (HRPD) network, a CDMA2000 1x network, GSM, Long-Term Evolution (LTE), and/or the like.

Some portions of the detailed description above are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program code. Algorithmic descriptions or symbolic representations are examples of techniques used by those of ordinary skill in the signal processing or related arts to convey the substance of their work to others skilled in the art. An algorithm is here, and generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated.

It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. For example, a specific computing apparatus may comprise one or more processing units programmed with instructions to perform one or more specific functions.

Methodologies described herein may be implemented by various means depending upon applications according to particular features and/or examples. For example, such methodologies may be implemented in hardware, firmware, software, and/or combinations thereof. In an implementation involving hardware, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other units designed to perform the functions described herein, and/or combinations thereof.

For a firmware and/or software implementation, certain methodologies may be implemented with modules (e.g., procedures, functions, and so on) that perform the functions described herein. Any machine readable medium tangibly embodying instructions may be used in implementing the methodologies described herein. For example, software codes may be stored in a memory of a mobile station, femtocell, and/or an access point and executed by a processing unit of the device. Memory may be implemented within a processing unit and/or external to the processing unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. A computer-readable medium may take the form of an article of manufacture. Computer-readable media include physical computer storage media. A storage medium may be any available medium that can be accessed by a computer. By way of example, and not limitation, such computer-readable media can comprise RAM, ROM, EEPROM, flash memory, CD-ROM or other optical disk storage, magnetic disk storage, semiconductor storage, or other storage devices, or any other medium that can be used to store desired program code in the form of instructions or data structures and that can be accessed by a computer/processing unit; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable medium, instructions and/or data may be provided as signals on transmission media included in a communication apparatus. For example, a communication apparatus may include a transceiver having signals indicative of instructions and data. The instructions and data are configured to cause one or more processing units to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

"Instructions" as referred to herein relate to expressions which represent one or more logical operations. For example, instructions may be "machine-readable" by being interpretable by a machine/computer for executing one or more operations on one or more data objects. However, this is merely an example of instructions and claimed subject matter is not limited in this respect. In another example, instructions as referred to herein may relate to encoded commands which are executable by a processing unit having a command set which includes the encoded commands. Such an instruction may be encoded in the form of a machine language understood by the processing unit. Again, these are merely examples of an instruction and claimed subject matter is not limited in this respect.

"Network element," as used herein, may refer to a device that allows communication devices to communicate with a network. For example, a network element may comprise a base station or access point and may allow wireless communication devices to connect to a wireless network using Wi-Fi, Bluetooth, a cellular communication technology such as Code Division Multiple Access (CDMA), Time Division Multiple Access (TDMA), Frequency Division Multiple Access (FDMA), Orthogonal Frequency Division Multiple Access (OFDMA), Single-Carrier Frequency Division Multiple Access (SC-FDMA), or any other suitable wireless technology and/or standard.

In one implementation, a mobile device may estimate its own location by communicating with one or more nearby femtocells. A "femtocell," as used herein, may refer to a small cellular base station. Such a femtocell may connect to a service provider's network via broadband (such as, for example, via Digital Subscriber Line (DSL) or cable). A femtocell may, for example, utilize a technology such as Universal Mobile Telecommunications System (UTMS), Long Term Evolution (LTE), Evolution-Data Optimized or Evolution-Data only (EV-DO), Global System for Mobile communications (GSM), Worldwide Interoperability for Microwave Access (WiMAX), Code division multiple access (CDMA)-2000, or Time Division Synchronous Code Division Multiple Access (TD-SCDMA), to name just a few among many possible technologies compatible with femtocells. A femtocell may also have integrated Wi-Fi, in which case round-trip time ranging may be performed utilizing the femtocell.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of appended claims, and equivalents thereof.

What is claimed is:

1. A method for providing navigation instructions to a user of a mobile device, comprising:
   determining, using the mobile device, a location estimate for the mobile device within an indoor pedestrian navigation environment;
   receiving, at the mobile device, an input indicating a destination within the indoor pedestrian environment;
   determining, using the mobile device, a lowest cost path from the location estimate to the destination based at least in part on a number of navigation instructions associated with the lowest cost path and based on discounting the cost of any path containing multiple nodes at each of which there is a line of sight from the node to the destination; and
   displaying the destination and the lowest cost path to the destination on a user interface of the mobile device.

2. The method of claim 1, wherein displaying the lowest cost path comprises presenting audible navigation instructions corresponding to the lowest cost path.

3. The method of claim 2, wherein the audible navigation instructions comprise one or more directions between a first node and a second node.

4. The method of claim 1, further comprising detecting a turn decision location in the lowest cost path based, at least in part, on an angle separating an incoming node and an outgoing node of the lowest cost path and an option to turn in at least two directions.

5. The method of claim 1, further comprising discounting a total cost of the lowest cost path based, at least in part, on a distance between at least two nodes in the lowest cost path.

6. The method of claim 5, wherein the at least two nodes comprise adjacent nodes in the lowest cost path.

7. The method of claim 1, wherein the location estimate of the mobile device is determined by the mobile device.

8. The method of claim 7, wherein the location estimate of the mobile device is determined based at least in part on wireless communication with at least one wireless device associated with a known location.

9. The method of claim 8, wherein the wireless communication comprises a Wi-Fi communication.

10. The method of claim 8, wherein the location estimate of the mobile device is determined based at least in part on a Receive Signal Strength Indication (RSSI) of the wireless communication with the at least one wireless device.

11. The method of claim 8, wherein the location estimate of the mobile device is determined based at least in part on a measured Round Trip Time (RTT) of the wireless communication with the at least one wireless device.

12. The method of claim 1, wherein the location estimate of the mobile device is entered by the user via a user input device.

13. An apparatus, comprising:
an input device to receive an input indicating a destination within an indoor pedestrian environment;
one or more processing units to determine a lowest cost path from an estimated location of the apparatus to the destination based at least in part on a number of navigation instructions associated with the lowest cost path and based on discounting the cost of any path containing multiple nodes at each of which there is a line of sight from the node to the destination; and
an output device to display the destination and the lowest cost path to the destination on a user interface of the mobile device.

14. The apparatus of claim 13, wherein the output device comprises a speaker to present audible navigation instructions corresponding to the lowest cost path.

15. The apparatus of claim 13, wherein the one or more processing units is capable of detecting a turn decision location in the lowest cost path based, at least in part, on an angle separating an incoming node and an outgoing node of the lowest cost path and an option to turn in at least two directions.

16. The apparatus of claim 13, wherein the one or more processing units is capable of discounting a total cost of the lowest cost path based, at least in part, on a distance between at least two nodes in the lowest cost path.

17. The apparatus of claim 16, wherein the at least two nodes comprise adjacent nodes in the lowest cost path.

18. The apparatus of claim 13, wherein the one or more processing units is capable of determining the estimated location of the apparatus.

19. The apparatus of claim 18, wherein the estimated location of the apparatus is determined based at least in part on wireless communication with at least one wireless device associated with a known location.

20. The apparatus of claim 19, wherein the wireless communication comprises a Wi-Fi communication.

21. The apparatus of claim 19, wherein the estimated location of the apparatus is determined based at least in part on a Receive Signal Strength Indication (RSSI) of the wireless communication with the at least one wireless device.

22. The apparatus of claim 19, wherein the estimated location of the apparatus is determined based at least in part on a measured Round Trip Time (RTT) of the wireless communication with the at least one wireless device.

23. The apparatus of claim 13, wherein the estimated location of the apparatus is entered by the user via the user input device.

24. An apparatus, comprising:
means for receiving an input indicating a destination within an indoor pedestrian navigation environment;
means for determining a lowest cost path from a location estimate for a mobile device to the destination based at least in part on a number of navigation instructions associated with the lowest cost path to provide to a user and based on discounting the cost of any path containing multiple nodes at each of which there is a line of sight from the node to the destination; and
means for displaying the destination and the lowest cost path to the destination.

25. The apparatus of claim 24, wherein the means for displaying the lowest cost path is capable of presenting audible navigation instructions corresponding to the lowest cost path.

26. The apparatus of claim 25, wherein at least one of the audible navigation instructions comprises one or more directions between a first node and a second node.

27. The apparatus of claim 24, further comprising means for detecting a turn decision location in the lowest cost path based, at least in part, on an angle separating an incoming node and an outgoing node of the lowest cost path and an option to turn in at least two directions.

28. The apparatus of claim 24, further comprising means for discounting a total cost of the lowest cost path based, at least in part, on a distance between at least two nodes in the lowest cost path.

29. The apparatus of claim 28, wherein the at least two nodes comprise adjacent nodes in the lowest cost path.

30. The apparatus of claim 24, further comprising means for determining the location estimate of the apparatus.

31. The apparatus of claim 30, wherein the location estimate of the apparatus based at least in part on wireless communication with at least one wireless device associated with a known location.

32. The apparatus of claim 31, wherein the wireless communication comprises a Wi-Fi communication.

33. The apparatus of claim 31, wherein the means for determining are for determining the location estimate of the mobile device based at least in part on a Receive Signal Strength Indication (RSSI) of the wireless communication with the at least one wireless device.

34. The apparatus of claim 31, wherein the means for determining are for determining the location estimate of the mobile device based at least in part on a measured Round Trip Time (RTT) of the wireless communication with the at least one wireless device.

35. The apparatus of claim 24, further comprising means for determining the location estimate, comprising a user input device to receive the location estimate of the apparatus from the user.

36. An article, comprising:
a storage medium comprising machine-readable instructions executable by a special purpose apparatus to:
receive an input from indicating a destination within the indoor pedestrian environment;
determine a lowest cost path from a location estimate for a mobile device to the destination based at least in part on a number of navigation instructions associated with the lowest cost path and based on discounting the cost of any path containing multiple nodes at each of which there is a line of sight from the node to the destination; and
present the lowest cost path to a user.

37. The article of claim 36, wherein the machine-readable instructions are further executable by the special purpose apparatus to present audible navigation instructions corresponding to the lowest cost path.

38. The article of claim 37, wherein the audible navigation instructions comprises one or more directions between a first node and a second node.

39. The article of claim 36, wherein the machine-readable instructions are further executable by the special purpose apparatus to detect a turn decision location in the lowest cost path based, at least in part, on an angle separating an incoming node and an outgoing node of the lowest cost path and an option to turn in at least two directions.

40. The article of claim 36, wherein the machine-readable instructions are further executable by the special purpose apparatus to discount a total cost of the lowest cost path based, at least in part, on a distance between at least two nodes in the lowest cost path.

41. The article of claim 36, wherein the machine-readable instructions are further executable by the special purpose apparatus to determine the location estimate for the mobile device based at least in part on wireless communication with at least one wireless device associated with a known location.

42. The article of claim 41, wherein the wireless communication comprises a Wi-Fi communication.

43. The article of claim 41, wherein the machine-readable instructions are further executable by the special purpose apparatus to determine the location estimate of the mobile device based at least in part on a Receive Signal Strength Indication (RSSI) of the wireless communication with the at least one wireless device.

44. The article of claim 41, wherein the machine-readable instructions are further executable by the special purpose apparatus to determine the location estimate of the mobile device based at least in part on a measured Round Trip Time (RTT) of the wireless communication with the at least one wireless device.

45. The article of claim 36, wherein the location estimate of the mobile device is entered by the user via a user input device.

46. The method of claim 1 wherein determining the lowest cost path further comprises discounting the cost associated with consecutive segments between which the user can traverse without turning.

47. The method of claim 1 wherein determining the lowest cost path from the location estimate to the destination is further based at least in part on a crowdedness condition of segments included in the lowest cost path, and lighting conditions of segments included in the lowest cost path.

48. The method of claim 1 wherein a zero cost is associated with each node having only one direction in which the user may advance from the node.

49. The method of claim 1, further comprising applying a cost associated with each node along the lowest cost path at which a turning point is present, the cost being proportionate to a measurement of an angle of a turn at the turning point.

50. The method of claim 1, further comprising:
applying a discount to the cost associated with each node from which the user may advance in a plurality of directions and through which a respective possible path passes without requiring the user to change a direction of travel, and wherein the cost associated with each node is proportionate to a number of possible directions in which the user may advance from the node.

51. The method of claim 1, wherein the cost being based at least in part on audio capabilities of the mobile device, display capabilities of the mobile device, or a combination thereof.

* * * * *